United States Patent
Shigemoto

(10) Patent No.: US 9,804,014 B2
(45) Date of Patent: Oct. 31, 2017

(54) OIL LEVEL GAUGE MOUNTING STRUCTURE

(71) Applicant: HONDA MOTOR CO., LTD., Tokyo (JP)

(72) Inventor: Kazunari Shigemoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 234 days.

(21) Appl. No.: 14/789,987

(22) Filed: Jul. 2, 2015

(65) Prior Publication Data

US 2016/0003661 A1    Jan. 7, 2016

(30) Foreign Application Priority Data

Jul. 3, 2014    (JP) .................. 2014-137751

(51) Int. Cl.
    G01F 23/04    (2006.01)
(52) U.S. Cl.
    CPC .................. G01F 23/04 (2013.01)
(58) Field of Classification Search
    CPC ...................................................... G01F 23/04
    USPC ........... 33/365, 721–730, 731; 116/227, 228; 215/224, 317
    See application file for complete search history.

(56) References Cited

U.S. PATENT DOCUMENTS

| | | | | | |
|---|---|---|---|---|---|
| 1,981,270 A | * | 11/1934 | Hollingsworth | ...... | G01F 23/045 33/730 |
| 2,029,672 A | * | 2/1936 | Rankin | ................. | G01F 23/045 15/220.4 |
| 2,738,587 A | * | 3/1956 | Nelson | ..................... | G01F 23/04 33/728 |
| 3,377,708 A | * | 4/1968 | Gassman | ............... | B65D 90/34 33/727 |
| 3,488,855 A | * | 1/1970 | Howe | ..................... | G01F 23/04 33/729 |
| 3,626,596 A | * | 12/1971 | Manke | ..................... | G01F 23/04 33/731 |
| 4,155,166 A | * | 5/1979 | Rochow | .................. | G01F 23/04 33/727 |
| 4,174,574 A | * | 11/1979 | Kirchweger | ........... | F01M 11/12 181/204 |

(Continued)

FOREIGN PATENT DOCUMENTS

| JP | 2587583 Y2 | 12/1994 |
|---|---|---|
| JP | 2006-189001 | 7/2006 |

*Primary Examiner* — R. A. Smith
*Assistant Examiner* — Tania Courson
(74) *Attorney, Agent, or Firm* — Mori & Ward, LLP

(57) ABSTRACT

An oil level gauge mounting structure includes an oil level gauge, a dipstick insertion hole, a peripheral wall, and an opening portion. The oil level gauge includes a grip portion and a dipstick. The grip portion has a finger insertion hole which defines a finger insertion direction for the finger insertion hole and into which a finger of an operating person is to be inserted from the finger insertion direction for the finger insertion hole. The peripheral wall surrounds the grip portion from directions except the finger insertion direction for the finger insertion hole so as to define an insertion recess portion to receive the grip portion in a state in which the dipstick is inserted in the dipstick insertion hole. The opening portion is open in the finger insertion direction for the finger insertion hole in the state in which the dipstick is inserted in the dipstick insertion hole.

23 Claims, 6 Drawing Sheets

(56) References Cited

U.S. PATENT DOCUMENTS

| | | | | |
|---|---|---|---|---|
| 4,184,370 A * | 1/1980 | Schlick | ............ | G01F 23/36 338/33 |
| 4,965,942 A * | 10/1990 | Hoszowski | ............ | G01F 23/04 116/227 |
| 5,113,594 A * | 5/1992 | Ishihara | ............ | G01F 23/04 33/722 |
| 5,613,303 A * | 3/1997 | Kayano | ............ | G01F 23/04 33/722 |
| 5,992,037 A * | 11/1999 | Klotz | ............ | G01F 23/04 123/196 R |
| 6,752,173 B2 * | 6/2004 | Sundqvist | ............ | G01F 23/04 138/89 |
| 8,820,290 B2 * | 9/2014 | Sotani | ............ | B60K 11/02 123/196 R |
| 2016/0178424 A1 * | 6/2016 | Martin | ............ | G01F 23/04 33/722 |

\* cited by examiner

OIL LEVEL GAUGE MOUNTING STRUCTURE

CROSS-REFERENCE TO RELATED APPLICATIONS

The present application claims priority under 35 U.S.C. §119 to Japanese Patent Application No. 2014-137751, filed Jul. 3, 2014, entitled "Oil Level Gauge Mounting Structure." The contents of this application are incorporated herein by reference in their entirety.

BACKGROUND

1. Field

The present disclosure relates to an oil level gauge mounting structure.

2. Description of the Related Art

In order to check the amount of oil held in the oil pan of an automotive internal combustion engine, a stick-shaped or belt-shaped oil level gauge is provided according to the related art. Furthermore, there is a related technology in which an oil return passageway is used as a passageway for an oil level gauge in order to, for example, make a compact engine (see, e.g., Japanese Unexamined Patent Application Publication No. 2006-189001). Since the oil return passageway is not provided as an passageway for the oil level gauge, a gauge surface provided on a distal end portion of the oil level gauge is provided with a guard wall portion extending over the entire length of the gauge surface and protruded from the gauge surface in a direction orthogonal to the gauge surface so that when the oil level gauge is inserted into or pulled out of the oil return passageway, the gauge surface does not contact a wall surface of the oil return passageway.

Not only in the case where an oil return passageway as mentioned above is utilized as a passageway for an oil level gauge but also in the case where a passageway dedicated to an oil level gauge is provided, if the oil level gauge passageway is curved due to constrictions for a compact design of the internal combustion engine or if the engine is mounted in an inclined posture, there is a need to direct the gauge surface in such a predetermined direction as to reduce the contact between the gauge surface and the wall surface of the passageway.

As for the oil level gauge of Japanese Unexamined Patent Application Publication No. 2006-189001, in order to ensure that the oil level gauge will be mounted so that the gauge surface will face such a predetermined direction as to avoid contacting a bolt used to attach an oil-circulating pump, there is provided such an arrangement that the mounting of the oil level gauge cannot be completed unless the gauge surface is directed in the predetermined direction by engaging a cutout portion provided in a collar portion provided in an upper portion of the oil level gauge with a V-shaped projection portion provided on a head cover.

On another hand, in an assembly process at a factory, standardization of operations is required, so that there is a need to provide a measure to restrict the direction in which an operating person's finger is inserted in the grip portion. For example, there exists a related-art technology in which the head cover is provided with a recess portion that has three wall surfaces that surround the grip portion (knob portion) on three sides (see Japanese Registered Utility Model No. 2587583). According to this technology, when the mounting of an oil level gauge is performed, an operating person's finger is inserted in the grip portion (knob portion) so that a distal end portion of the finger reaches a deeper side in the recess portion. Thus, the finger insertion direction relative to the grip portion (knob portion) can be restricted.

SUMMARY

According to one aspect of the present invention, an oil level gauge mounting structure for an oil level gauge that measures a lubricating oil surface position in an oil pan of an internal combustion engine includes the oil level gauge, a dipstick insertion hole, a peripheral wall, and an opening portion. The oil level gauge includes a grip portion of the oil level gauge which has a finger insertion hole into which a finger of an operating person is inserted, and a dipstick that extends from the grip portion and that measures the lubricating oil surface position in the oil pan. The dipstick insertion hole is provided in an upper portion of the internal combustion engine which accepts insertion of the dipstick. The peripheral wall is provided in the upper portion of the internal combustion engine which at least partially defines an insertion recess portion that receives the grip portion by surrounding the grip portion, except from a finger insertion direction for the finger insertion hole, when the dipstick is inserted in the insertion hole. The opening portion is provided in the upper portion of the internal combustion engine which is open in the finger insertion direction for the finger insertion hole. The insertion recess portion has such a shape that the insertion recess portion is capable of receiving the grip portion in such a facing direction that the finger insertion direction is substantially aligned with a direction of the opening portion but is incapable of receiving the grip portion in any other facing direction.

According to another aspect of the present invention, an oil level gauge mounting structure includes an oil level gauge, a dipstick insertion hole, a peripheral wall, and an opening portion. The oil level gauge includes a grip portion and a dipstick. The grip portion has a finger insertion hole which defines a finger insertion direction for the finger insertion hole and into which a finger of an operating person is to be inserted from the finger insertion direction for the finger insertion hole. The dipstick extends from the grip portion to measure a lubricating oil surface position in an oil pan of an internal combustion engine. The dipstick insertion hole is provided in an upper portion of the internal combustion engine and the dipstick is inserted into the dipstick insertion hole. The peripheral wall is provided in the upper portion of the internal combustion engine. The peripheral wall surrounds the grip portion from directions except the finger insertion direction for the finger insertion hole so as to define an insertion recess portion to receive the grip portion in a state in which the dipstick is inserted in the dipstick insertion hole. The opening portion is provided in the upper portion of the internal combustion engine. The opening portion is open in the finger insertion direction for the finger insertion hole in the state in which the dipstick is inserted in the dipstick insertion hole. The insertion recess portion has a shape so that the insertion recess portion receives the grip portion in a state in which the grip portion faces a facing direction in which the finger insertion direction for the finger insertion hole is substantially same as a direction of the opening portion and so that the insertion recess portion does not receive the grip portion in a state in which the grip portion faces another facing direction in which the finger insertion direction for the finger insertion hole is not substantially same as the direction of the opening portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
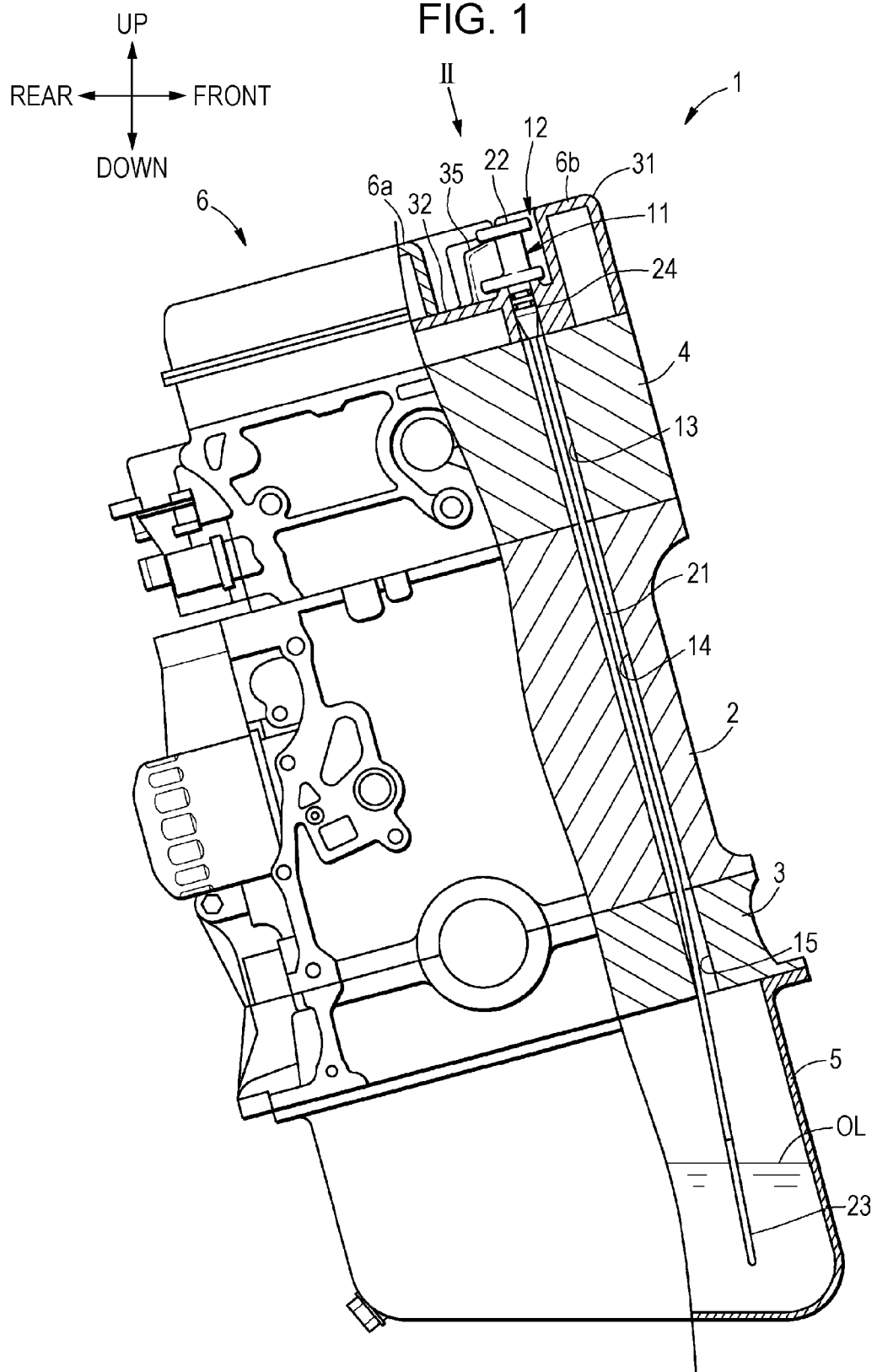
FIG. 1 is a cutaway front view of key portions of an internal combustion engine to which the present disclosure has been applied, the view being taken from a cylinder row direction.

The embodiments will now be described with reference to the accompanying drawings, wherein like reference numerals designate corresponding or identical elements throughout the various drawings.

Embodiments of the present disclosure will be described hereinafter with reference to the drawings.

FIG. 1 is a cutaway front view of key portions of an internal combustion engine 1, for example, an in-line multi-cylinder engine, to which the present disclosure has been applied, the view being viewed from a cylinder row direction. The internal combustion engine 1 shown in FIG. 1 has a cylinder block 2, a lower block 3 fixed to a lower surface of the cylinder block 2, a cylinder head 4 fixed to an upper surface of the cylinder block 2, and an oil pan 5 fixed to a lower surface of the lower block 3. A head cover 6 is provided on an upper surface of the cylinder head 4. The head cover 6 constitutes an upper portion of the internal combustion engine 1.

Figure 2:
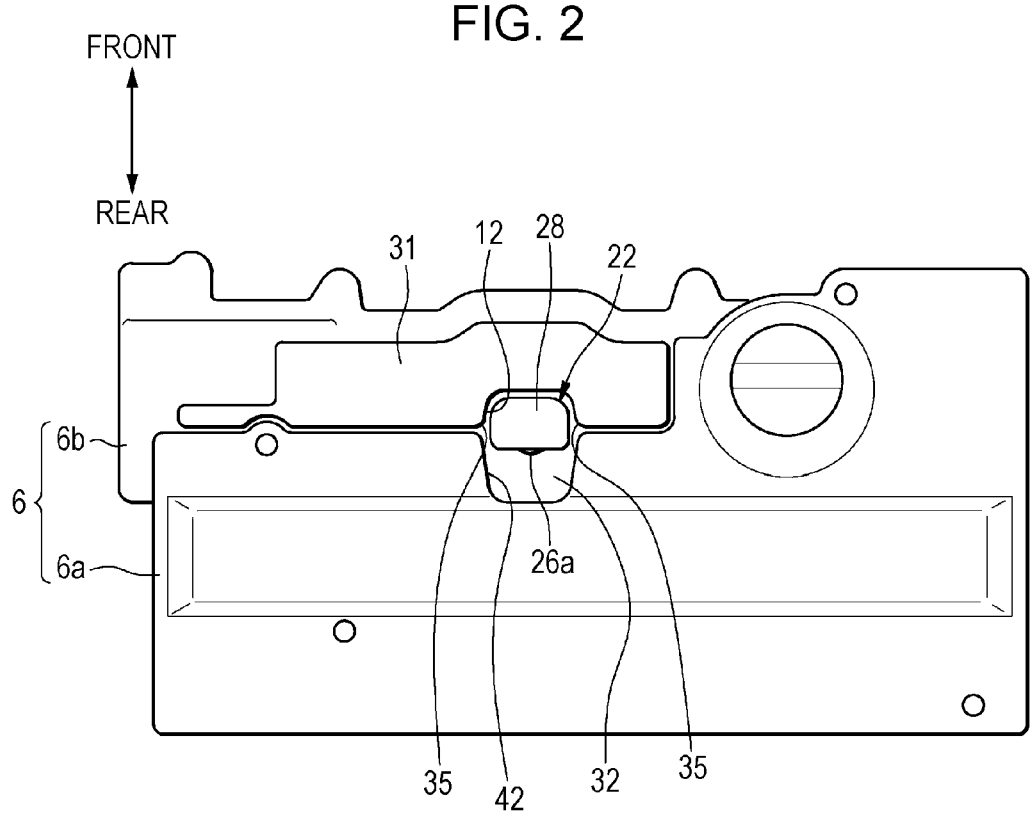
FIG. 2 is a top view of a head cover viewed from the direction indicated by an arrow II in FIG. 1.

As shown also in FIG. 2, the head cover 6 in this embodiment is composed of a first head cover part 6a that covers substantially the entire cylinder head 4, and a second head cover part 6b that is disposed on the right side in FIG. 1 and that is provided with an insertion recess portion 12 that has an insertion hole 34a described below. In this embodiment, the second head cover part 6b is provided as a breather chamber case that has therein a gas-liquid separating passageway that carries therein blowby gas. The cylinder block 2, the cylinder head 4, and the lower block 3 are provided with gauge passageways 13 to 15 that communicate with each other to form a single through hole. The insertion hole 34a and the inside of the oil pan 5 communicate with each other via the gauge passageways 13 to 15.

The oil level gauge 11 has an elongated dipstick 21 that is formed from a thin-walled steel sheet having a flexibility (e.g., a spring steel sheet), and a grip portion 22 made of a synthetic resin which is fixed to an upper end of the dipstick 21. A lower end portion of the dipstick 21 is provided with an oil surface detection portion 23 that has on one side thereof a gauge surface (not shown in the drawings). Incidentally, a dipstick 21 side of the grip portion 22 is provided with a cylindrical shaft portion 24. O-rings 25 (FIG. 3) for securing sealing are fitted on the shaft portion 24, while being spaced from each other in an axis direction of the shaft portion 24.

The second head cover part 6b includes an island portion 31 formed as a protrusion that extends in the cylinder row direction and having an upper surface that is substantially continuous to an upper surface of the first head cover part 6a, a bottom portion 32 that extends at the foot of the island portion 31 and that is covered by the first head cover part 6a, and a shelf portion 33 (FIG. 3) that is provided on the bottom portion 32 side of the island portion 31 and that is lower than the upper surface of the island portion 31 by an amount that corresponds to the thickness of an adjacent edge portion of the first head cover part 6a so as to accommodate placement of the adjacent edge portion.

Figure 3:
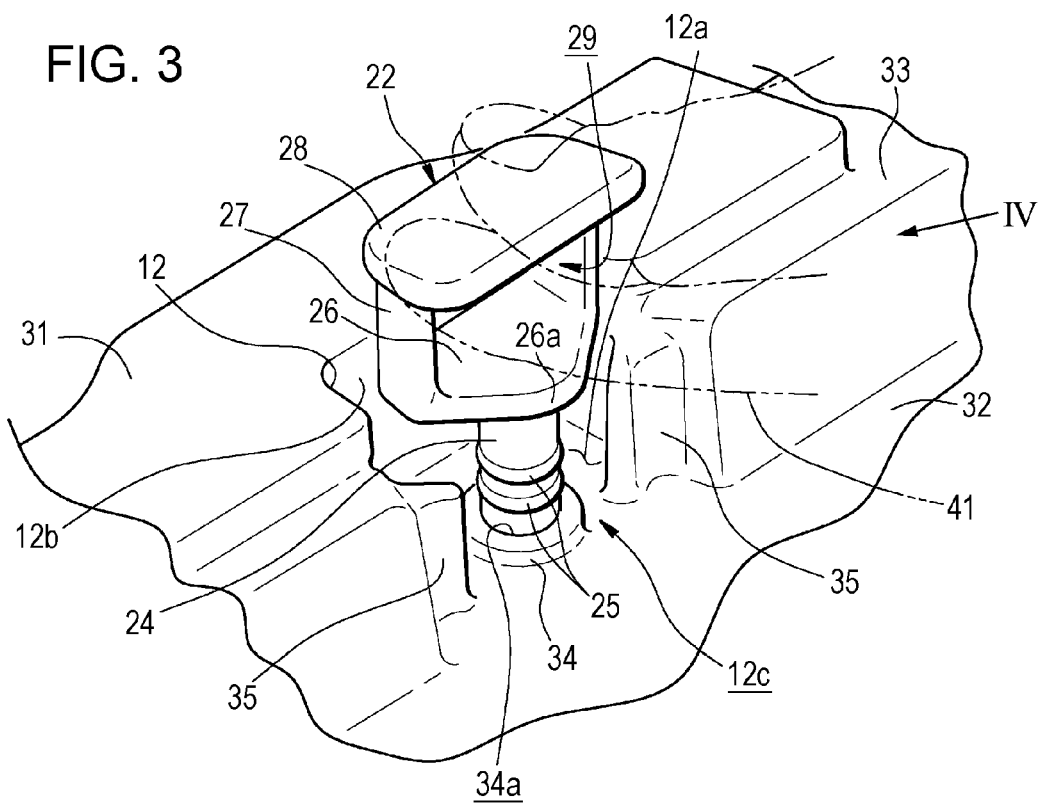
FIG. 3 is an enlarge perspective view of key portions of an oil level gauge insertion portion, with a first head cover having been removed.
Figure 4:
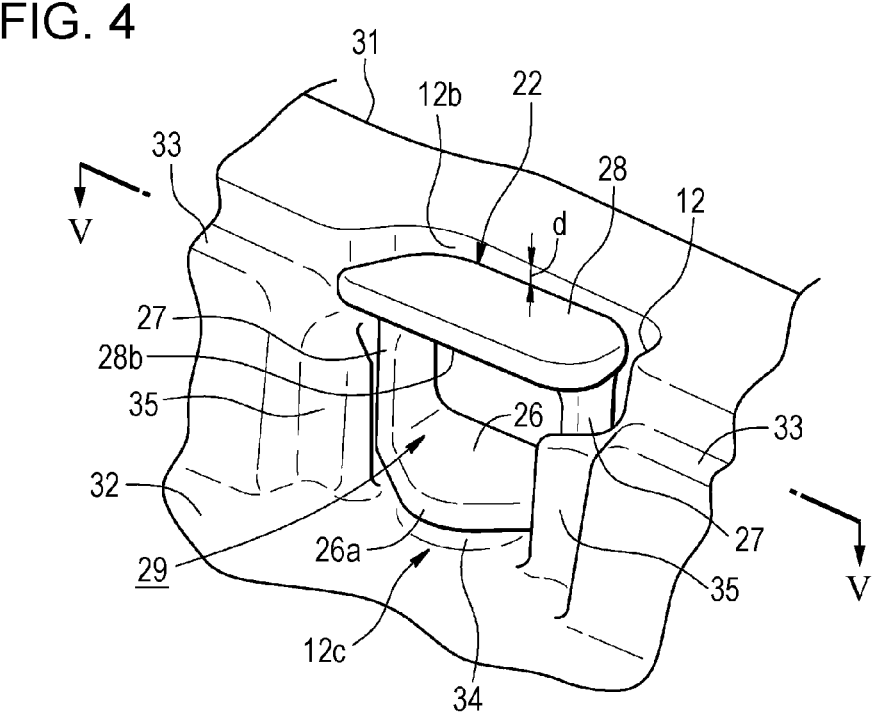
FIG. 4 is a perspective view viewed from the direction indicated by an arrowed line IV in FIG. 3, showing a mounted state of an oil level gauge.

The insertion recess portion 12, as shown FIG. 3 and FIG. 4, is made up of a recess structural body recessed from the upper surface of the second head cover part 6b, and includes a bottom surface 12a that continues to the upper surface of the bottom portion 32 at a location in a central portion of the internal combustion engine 1 in the cylinder row direction so that the insertion recess portion 12 is open to the bottom portion 32 side, and a peripheral wall 12b standing from the bottom surface 12a at three sides of the insertion recess portion 12 other than the side of the opening portion 12c that is open to the bottom portion 32 side. Thus, the peripheral wall 12b extends in a cross-sectional squared U-shape when viewed in the direction in which to insert the dipstick 21 into the insertion hole 34a (hereinafter, referred to as insertion direction view). In the example shown in FIGS. 3 and 4, the peripheral wall 12b spreads slightly in a somewhat V-shape to the opening portion 12c side.

A cylindrical boss portion 34 is protruded from the bottom surface 12a. The boss portion 34 has a coaxial insertion hole 34a that is formed by a through hole that communicates with the gauge passageway 13 of the cylinder head 4. The shaft portion 24 of the oil level gauge 11 is inserted into the insertion hole 34a, and the O-rings 25 secure water-tightness between the insertion hole 34a and the shaft portion 24. Furthermore, the shaft portion 24 side of the grip portion 22 is provided with a base portion 26 that has an outward flange shape that is larger in a diametrical dimension than the boss portion 34.

By inserting the oil level gauge 11 from the insertion hole 34a, an oil surface detection portion 23 passes through the gauge passageways 13 to 15 and enters the oil pan 5. By further inserting the oil level gauge 11, the base portion 26 contacts the upper surface of the boss portion 34 to restrict the amount of insertion of the oil level gauge 11. Thus, a predetermined amount of the oil surface detection portion 23 is dipped in the engine oil within the oil pan 5.

Figure 5:
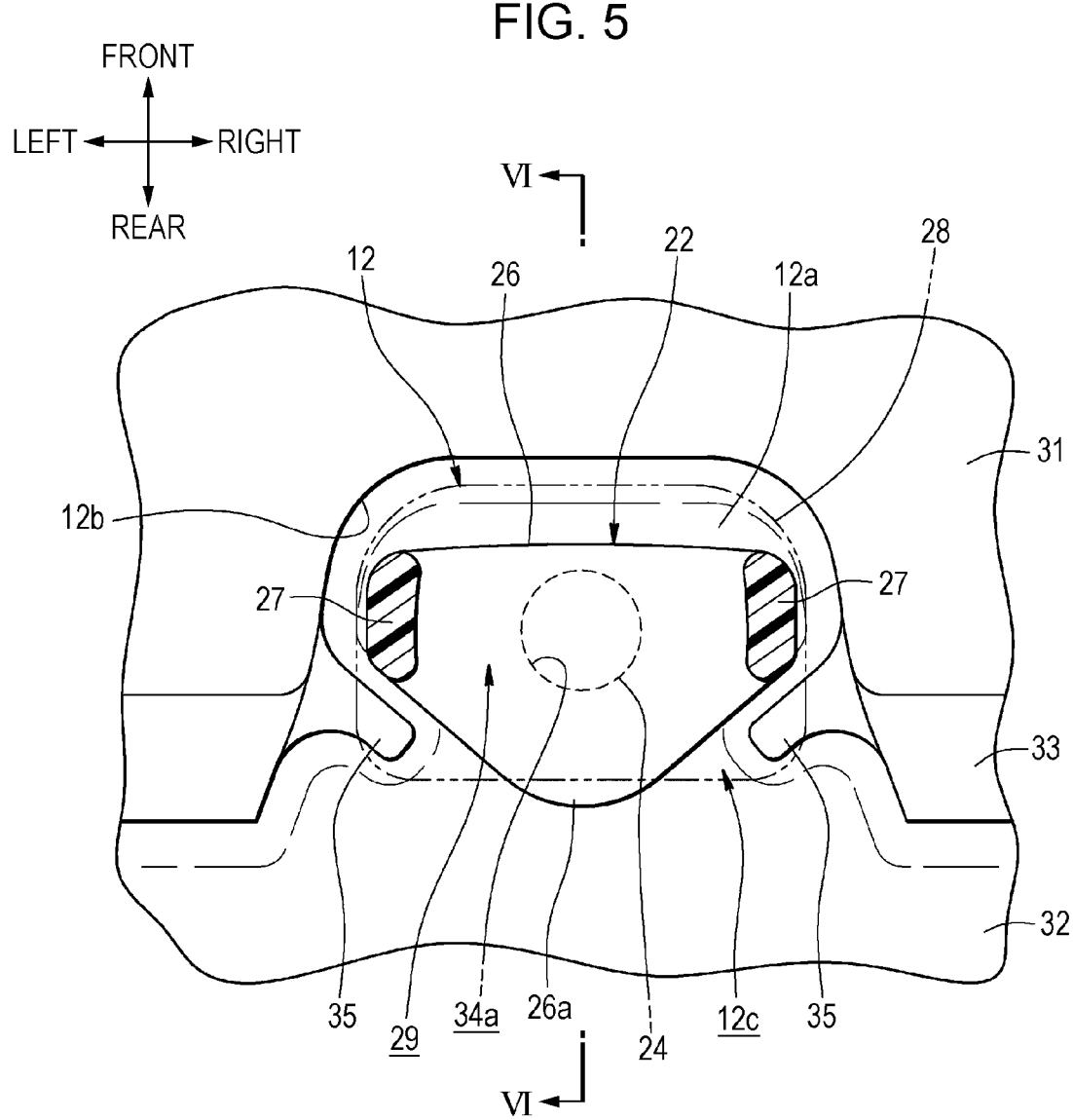
FIG. 5 is a plane sectional view taken along line V-V in FIG. 4 and viewed in the direction indicated by arrowed lines.

As shown also in FIG. 5, the peripheral wall 12b is elevated from the bottom surface 12a so as to surround the insertion hole 34a. Two end portions of the peripheral wall 12b that face each other across an opening portion of the peripheral wall 12b that is open to the bottom portion 32 side are respectively provided with extension walls 35 that extend out from the end portions in such oblique directions that the extension walls 35 become closer to each other toward the bottom portion 32 side and therefore the opening width of the opening portion of the peripheral wall 12b is reduced. Extension ends of the two extension walls 35 partially define an opening portion 12c through which a portion surrounded by the peripheral wall 12b and the extension walls 35 is open to the bottom portion 32 side. The insertion recess portion 12 is made up of the portion that is surrounded by the peripheral wall 12b and the extension walls 35, and has a protruded-shape portion that is protruded to the bottom portion 32 side when viewed in the direction in which to insert the dipstick 21 into the insertion hole 34a. Incidentally, the extension walls 35 stand to a height that is lower than the upper surface of the island portion 31.

The grip portion 22 of the oil level gauge 11 is composed of the platy base portion 26, a pair of connecting walls 27 standing from left and right end portions of the base portion 26, and a platy finger hook member 28 that is coupled to a counter insertion-direction side surface of the base portion 26 (a side surface in the direction opposite to the direction in which to insert the dipstick 21 into the insertion hole 34a) via the two connecting walls 27 and that is parallel to the base portion 26. The base portion 26 has a protruded-shape portion 26a that protrudes into the opening portion 12c between the two extension walls 35 as shown in FIG. 5 during a state in which the dipstick 21 has been inserted in the insertion hole 34a so that the base portion 26 is in contact with the upper surface of the boss portion 34 (hereinafter, referred to as the inserted state). The protruded-shape portion 26a has a baseball home base shape that matches the internal protruded shape of the insertion recess portion 12. The finger hook member 28, as shown also in FIG. 2, has a generally rectangular shape that substantially covers an upper opening face of the insertion recess portion 12 in the insertion direction view and that extends over the two extension walls 35. The grip portion 22 has a finger insertion hole 29 that is made up of a through hole surrounded by the base portion 26, the connecting walls 27, and the finger hook member 28.

Furthermore, a wall that faces the opening portion 12c of the peripheral wall 12b linearly extends in a direction of the opening width (the left-right direction in FIG. 5) of the opening portion 12c in the insertion direction view, and the opening portion 12c frontally faces the center of the aforementioned linearly extending wall of the peripheral wall 12b. The insertion recess portion 12 has a generally squared U-shape that is open to the opening portion 12c side in the insertion direction view that is determined by the shape of the foregoing peripheral wall 12b, and is symmetrical about a straight line that passes through a center of the opening portion 12c and an axis of the insertion hole 34a in the insertion direction view. Incidentally, the two extension walls 35 are also symmetrical about the axis of the insertion hole 34a.

The base portion 26, in the insertion direction view, has a shape complementary to the shape of the insertion recess portion 12 and, as a whole, has a pentagonal shape in which the aforementioned protruded-shape portion 26a is triangularly protruded. In the base portion 26 having a pentagonal shape as described above, the triangularly protruded vertex is located on a straight line that passes through the center of the opening portion 12c and the axis of the insertion hole 34a. The base portion 26 is symmetrical about this straight line.

The finger hook member 28, as shown by a two-dot chain line in FIG. 5, has an external shape whose outer edge, during the inserted state, faces the peripheral wall 12b with a small space therebetween. When the grip portion 22 is received in the insertion recess portion 12, substantially the entire insertion recess portion 12 is covered by the finger hook member 28 in the insertion direction view, so that when the upper surface of the internal combustion engine 1 is washed, water can be restrained from entering the insertion recess portion 12. Furthermore, in this embodiment, during the inserted state, an upper surface of the finger hook member 28 that is a surface opposite to the insertion direction side is lower than the upper surface of the island portion 31 (indicated by d in FIG. 4), and therefore, in a side view, the finger hook member 28 is hidden by the island portion 31. Therefore, if water flowing on the upper surface of the island portion 31 flows down to the insertion recess portion 12, the water flows on the upper surface of the finger hook member 28 and down to the bottom portion 32. Thus, water can be more certainly restrained from entering the insertion recess portion 12 when the upper surface of the internal combustion engine 1 is washed. Note that although, in this embodiment, the upper surface of the finger hook member 28 is lower than the upper surface of the island portion 31, it suffices that a lower surface 28b of the finger hook member 28 that is an insertion direction-side surface is located lower than the upper surface of the island portion 31. In this case, a peripheral surface of the finger hook member 28 blocks water from flowing to the insertion recess portion 12 side.

An operation of inserting or pulling out the oil level gauge 11 can be performed by inserting a finger 41 into the finger insertion hole 29 and gripping the finger hook member 28 with, for example, the finger and the thumb as shown by two-dot chain lines in FIG. 3. The insertion recess portion 12 has the peripheral wall 12b standing on three sides other than the opening portion 12c side from the bottom surface 12a, and has been shaped so as to receive the grip portion 22 by surrounding the grip portion 22 from three directions other than the insertion direction of the finger 41. Due to this, the insertion direction of the finger 41 can be easily known by visual observation. When the finger 41 is inserted in the finger insertion hole 29, a proximal side of the finger 41 is located to the bottom portion 32 side relative to the insertion recess portion 12. Therefore, in order to avoid interference with the finger 41 during the operation, a portion of the first head cover part 6a which faces the insertion recess portion 12, as shown in FIG. 2, is provided with a recessed portion 42 that is open to the upper surface of the first head cover part 6a and also open to the bottom portion 32. Due to this configuration, a large space in which the finger 41 can be moved upward and downward during the operation of inserting or pulling out the oil level gauge 11 is secured, so that the operation can be easily carried out.

When a mounting operation in which the oil level gauge 11 is inserted is to be performed, the protruding direction of the protruded-shape portion 26a of the base portion 26 is aligned with the direction of the opening portion 12c. Incidentally, it is advisable that the distance from the insertion hole 34a to the protruded end of the protruded-shape portion 26a be longer than the distance from the insertion hole 34a to the opposite surface of the peripheral wall 12b to the opening portion 12c. Due to this, if the protruding direction of the protruded-shape portion 26a is in reverse (if the protruding direction of the protruded-shape portion 26a is 180 degrees relative to the direction to the opening portion 12c), the finger 41 inserted in the finger insertion hole 29 points in the opening direction of the opening portion 12c but the protruded-shape portion 26a contacts the upper surface of the island portion 31. Therefore, the mismounting of the oil level gauge 11 can be prevented.

Furthermore, in the case where the operation of inserting the oil level gauge 11 is performed when the protruding direction of the protruded-shape portion 26a is a direction that is other than the direction of the opening portion 12c and that is different from the aforementioned reverse direction, the finger 41 inserted in the finger insertion hole 29 cannot enter the opening portion 12c, so that the operating person will attempt to insert the oil level gauge 11 by, for example, pushing the upper surface of the finger hook member 28 with the finger 41 or the thumb. In this case, the base portion 26 and the insertion recess portion 12 do not agree, since the base portion 26 is pentagonal and the insertion recess portion 12 is complementary in shape. Furthermore, since in this embodiment, the base portion 26 has been formed to have such a size or dimensions that the space between the base portion 26 and the insertion recess portion 12 is narrow, a portion of the base portion 26 impinges on the island portion 31. That is, in this case, too, the oil level gauge 11 cannot be mounted. Thus, the proper mounting of the oil level gauge 11 with its facing direction set in the predetermined direction can be ensured.

Furthermore, since the mismounting of the oil level gauge 11 can be prevented by visually aligning the protruding direction of the protruded-shape portion 26a with a direction of the opening portion 12c at the time of performing the operation of inserting the oil level gauge 11, the shape of the protruded-shape portion 26a does not necessarily need to be triangular as in the example shown in FIGS. 3 to 5. For example, the base portion 26 may have a rectangular shape in the insertion direction view, and a side surface of the base portion 26 which, in the proper placement, faces the opening portion 12c may be provided with, for example, a projection that has a length that does not reach the opening portion 12c but that corresponds to the opening width of the opening portion 12c. Thus, the mismounting can be prevented by designing the base portion 26 so that the base portion 26 has a shape that corresponds to the opening portion 12c.

When the lubricating oil surface position (indicated by OL in FIG. 1) in the oil pan 5 is to be checked, a finger is put into the finger insertion hole 29 and the grip portion 22 is held with the finger to pull out the oil level gauge 11 from the insertion hole 34a. In the case where the internal combustion engine 1 is mounted in an inclined posture as shown in FIG. 1 in a vehicle, the dipstick 21 flexibly bends so that the oil surface detection portion 23 skews. Therefore, when the oil level gauge 11 in this state is pulled out, there is a risk of the oil surface detection portion 23 contacting an inner peripheral surface or an edge of the gauge passageways 13 to 15 or the insertion hole 34a.

Since the side of the oil surface detection portion 23 that contacts the inner peripheral surface of the gauge passageway or the like due to the flexible bending of the dipstick 21 is clearly known from the inclination direction of the internal combustion engine 1, an undesired event in which the engine oil adhering to the gauge surface of the oil surface detection portion 23 contacts the inner peripheral surface or the like and the boundary of the engine oil on the gauge surface becomes obscure can be avoided by providing the gauge surface on the side opposite to the side that contacts the inner peripheral surface or the like. Therefore, it is appropriate to restrict the mounting direction of the oil level gauge 11 at the time of inserting the oil level gauge 11.

As described above, in the operation of inserting the oil level gauge 11, after the base portion 26 is received in the space surrounded by the peripheral wall 12b of the insertion recess portion 12, the protruded-shape portion 26a and the opening portion 12c are aligned in the insertion direction view prior to inserting the oil level gauge 11. More specifically, the direction of the finger 41 inserted in the finger insertion hole 29 is set so that the pointing direction of the finger 41 is aligned with a direction of the opening portion 12c when the operation of inserting the oil level gauge 11 is performed. As a result, a mounted state in which the protruded-shape portion 26a of the base portion 26 protrudes into the opening portion 12c is assumed, and the facing direction of the oil level gauge 11, that is, the facing direction of the oil surface detection portion 23, is set. Thus, the facing direction of the gauge surface of the oil surface detection portion 23 can be set so that when the oil level gauge 11 is pulled out, the gauge surface of the oil surface detection portion 23 does not contact the inner peripheral surface or the edge of the gauge passageways 13 to 15 or the insertion hole 34a. In consequence, the lubricating oil surface position OL in the oil pan 5 can be accurately checked.

The protruded-shape portion 26a is provided in the direction of a line that passes through the finger insertion hole 29, so that in the operation of mounting the oil level gauge 11, the finger 41 inserted in the finger insertion hole 29 can be caused to lie along a line that passes through the opening portion 12c by aligning the protruded-shape portion 26a with the opening portion 12c. When the grip portion 22 is pushed in, the finger 41 can move downward in the opening portion 12c. Therefore, the mounting operation can be carried out without interference between the structural body of the insertion recess portion 12 and the finger 41, so that safety in the mounting operation is secured.

Furthermore, since the bottom portion 32 side of the insertion recess portion 12 is provided with the opening portion 12c whose opening width is reduced by the two extension walls 35, water intrusion into the insertion recess portion 12 can be blocked by the extension walls 35 even if water flowing down to the bottom portion 32 bounces toward the opening portion 12c. Furthermore, the protruded-shape portion 26a of the base portion 26 protrudes into the opening portion 12c, whereby the opening portion 12c is substantially closed. Therefore, even if water flowing down to the bottom portion 32 bounces toward the opening portion 12c, water intrusion into the insertion recess portion 12 can be further prevented.

Figure 6:
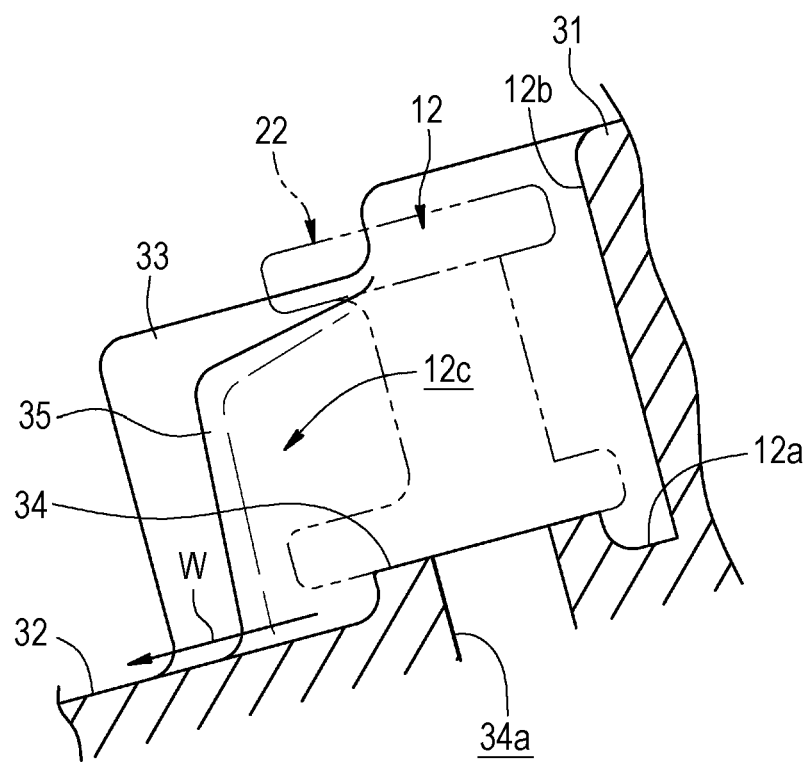
FIG. 6 is a key portion-side sectional view taken along line VI-VI in FIG. 5 and viewed in the direction indicated by arrowed lines.

Furthermore, in the case where the internal combustion engine 1 is mounted in an inclined posture as in this embodiment, it is advisable that the internal combustion engine 1 be inclined to such a side that the opening portion 12c faces downward. Due to this, even if water enters the insertion recess portion 12 when the upper surface of the internal combustion engine 1 is washed, water can flow from the opening portion 12c to the bottom portion 32 side as indicated by an arrow W in FIG. 6, so that occurrence of a risk of water residing in the insertion recess portion 12 and flowing into the insertion hole 34a can be prevented.

Furthermore, since the base portion 26 has the shape of an outward flange that is larger in a diametrical dimension than the boss portion 34, the insertion hole 34a can be covered by a larger area. Since the insertion hole 34a is covered by the base portion 26, water intrusion into the insertion recess portion 12 can be more certainly restrained even if water enters the insertion recess portion 12 when the upper surface of the internal combustion engine 1 is washed.

Furthermore, the base portion 26 is provided with the protruded-shape portion 26a, and the shape of the finger hook member 28 can be freely designed. Since the finger hook member 28 does not need to be protruded to the opening portion 12c side, a larger space can be secured at the opening portion 12c side by reducing the size of the finger hook member 28. As a result, the access of the finger 41 to the finger hook member 28 becomes good, so that the ease of the mounting operation can be improved.

Figure 7A:
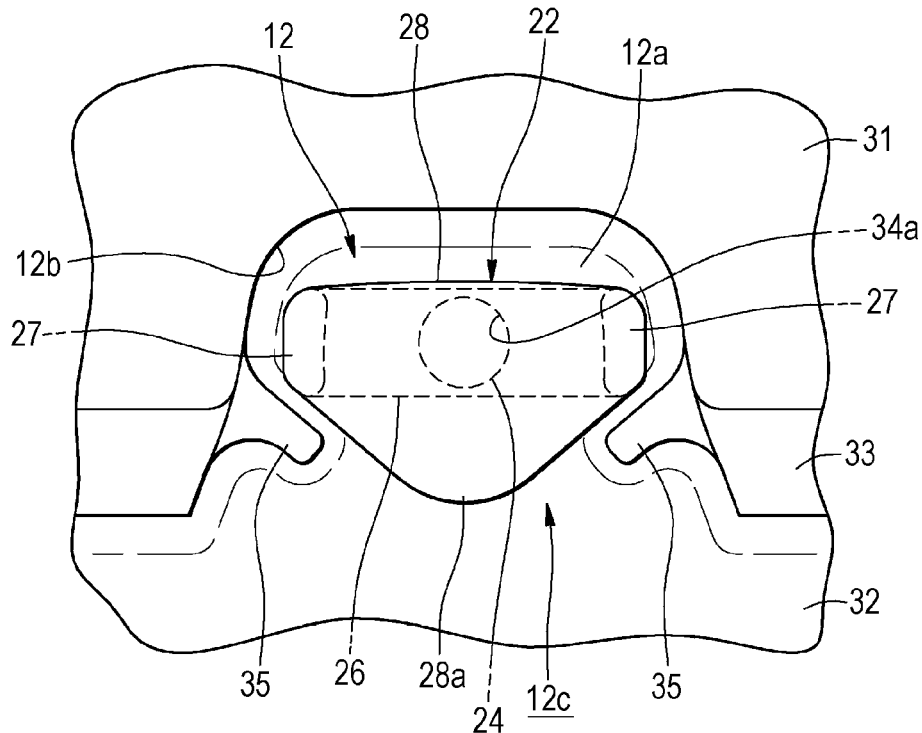
FIGS. 7A and 7B show a second embodiment, FIG. 7A being a top view that corresponds to FIG. 5, and FIG. 7B being a perspective view that corresponds to FIG. 4.
Figure 7B:
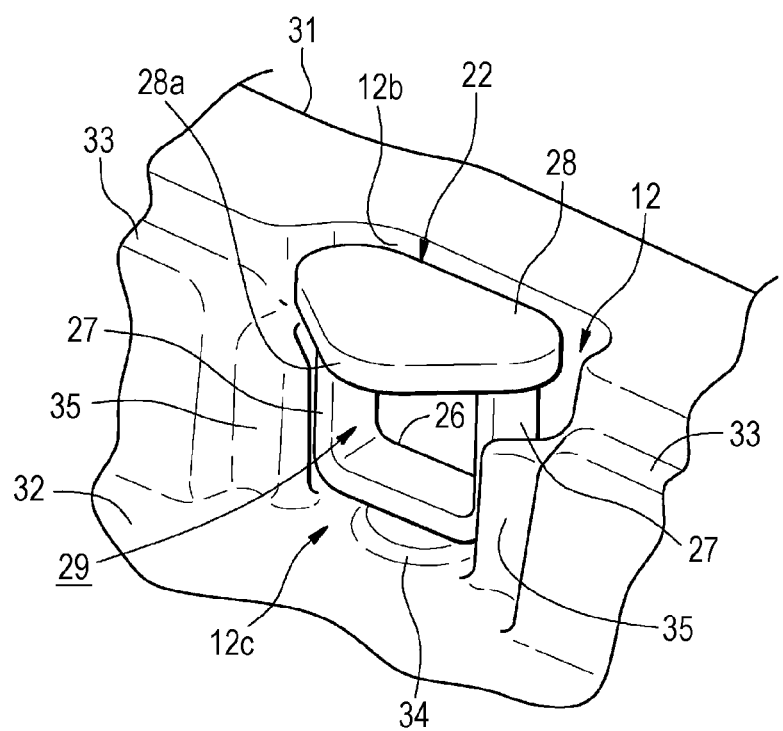

In the foregoing embodiment, the base portion 26 has the shape in which the protruded-shape portion 26a that protrudes into the opening portion 12c is provided, and the protruded-shape portion 26a and the opening portion 12c are aligned to restrict the facing direction of the oil level gauge 11. However, the facing direction of the oil level gauge 11 may be restricted by the shape of the finger hook member 28. A second embodiment of the disclosure as an example in which the facing direction of the oil level gauge 11 is restricted by the shape of the finger hook member 28 will be described with reference to FIG. 7A, which corresponds to FIG. 5, and FIG. 7B, which corresponds to FIG. 4. Incidentally, portions of the second embodiment comparable to those described above are denoted by the same reference characters, and detailed descriptions thereof will be omitted.

In the second embodiment, a finger hook member 28 of a grip portion 22 is provided with a protruded-shape portion 28a whose shape, in the insertion direction view, substantially conforms to the shape of the protruded-shape portion 26a in the first embodiment which protrudes into the opening portion 12c. Due to this, the finger hook member 28 is received in a space surrounded by the peripheral wall 12b of the insertion recess portion 12, with the protruded-shape portion 28a facing the opening portion 12c. Therefore, the facing direction of the oil level gauge 11 is restricted, so that the mismounting thereof can be prevented as in the first embodiment. In this embodiment, too, the mismounting can be prevented by a configuration in which the distance from the insertion hole 34a to the protruded end of the protruded-shape portion 28a is longer than the distance from the insertion hole 34a to an opposite surface of the peripheral wall 12b to the opening portion 12c.

Note that in the second embodiment, the base portion 26 does not need to be provided with a protruded-shape portion 26a. Therefore, in the process of inserting the base portion 26 into the insertion recess portion 12, there is no need to mind interference with the extension walls 35; instead, it suffices that toward the end of the operation of inserting the oil level gauge 11, the facing direction of the finger hook member 28 is set before the oil level gauge 11 is completely pushed in. Thus, the mounting operation can be easily carried out. Furthermore, the finger hook member 28 can close the insertion recess portion 12 in the insertion direction view, so that the second embodiment can achieve substantially the same water intrusion restraining effect as the first embodiment.

Furthermore, in the case where the finger hook member 28 is provided with the protruded-shape portion 28a, it becomes easier to hook the finger 41 on the protruded-shape portion 28a. As a result, the oil level gauge 11 can be pulled out without a need to fully insert the finger 41 into the finger insertion hole 29. Further, since the provision of the protruded-shape portion 28a adds to the area of the upper surface of the finger hook member 28, it becomes easier to press the upper surface of the finger hook member 28 with the finger 41 or the thumb when pushing down the grip portion 22 to insert the oil level gauge 11. Therefore, the ease of operation at the time of checking lubricating oil can be improved.

While the present disclosure has been described above with reference to the embodiments thereof, it should be easily understood by a person with ordinary skill in the art that the present disclosure is not limited to these embodiments but can be changed as appropriate without departing from the gist of the present disclosure. For example, although in the foregoing embodiments, the insertion recess portion 12 having a hole shape that is recessed from the upper surface of the head cover 6 (the upper surface of the island portion 31), it is also permissible to adopt a structural body that includes a cross-sectional C-shape cylindrical peripheral wall that stands from the bottom portion 32 so as to surround, in a C-shape, the insertion hole 34a. Furthermore, although the insertion recess portion 12 is provided as a recessed portion formed on the second head cover part 6b as a breather chamber case, the insertion recess portion 12 may be provided as a recessed portion formed on a head cover that covers the entire upper surface of the cylinder head 4. Still further, as for the components shown above in conjunction with the embodiments, not all are essential, are it is possible to select some of the components and omit some others as appropriate without departing from the gist of the present disclosure.

According to the present disclosure, there is provided an oil level gauge mounting structure for an oil level gauge that measures a lubricating oil surface position in an oil pan of an internal combustion engine. The oil level gauge mounting structure includes the oil level gauge that includes a grip portion of the oil level gauge which has a finger insertion hole into which a finger of an operating person is inserted, and a dipstick that extends from the grip portion and that measures the lubricating oil surface position in the oil pan, a dipstick insertion hole provided in an upper portion of the internal combustion engine which accepts insertion of the dipstick; a peripheral wall provided in the upper portion of the internal combustion engine which at least partially defines an insertion recess portion that receives the grip portion by surrounding the grip portion, except from a finger insertion direction for the finger insertion hole, when the dipstick is inserted in the insertion hole, and that receives the grip portion, and an opening portion provided in the upper portion of the internal combustion engine which is open in the finger insertion direction for the finger insertion hole. The insertion recess portion has such a shape that the insertion recess portion is capable of receiving the grip portion in such a facing direction that the finger insertion direction is substantially aligned with a direction of the opening portion but is incapable of receiving the grip portion in any other facing direction.

According to the foregoing construction, since an upper portion of the internal combustion engine is provided with the insertion recess portion that receives the grip portion when the dipstick of the oil level gauge is inserted in the insertion hole, and in which the shape of the insertion recess portion is such a shape as to surround the grip portion, except from the finger insertion direction for the finger insertion hole, and be capable of receiving the grip portion in such a facing direction that the finger insertion direction is substantially aligned with a direction of the opening portion but be incapable of receiving the grip portion in any other facing direction, it is possible to prevent the mismounting of the oil level gauge. Furthermore, since the grip portion is received in the insertion recess portion so that the finger insertion direction for the finger insertion hole of the grip portion is substantially aligned with a direction of the opening portion, the finger inserted in the finger insertion hole can be moved in the opening portion, which is favorable in terms of the ease of the operation of mounting the oil level gauge.

In the foregoing disclosure, the grip portion may include a base portion that is coupled to the dipstick and that is to face a bottom surface of the insertion recess portion and a finger hook member coupled, via a connecting wall, to a counter dipstick insertion direction side of the base portion that is opposite to a dipstick insertion direction side that faces in an insertion direction for the dipstick, and at least one of the base portion and the finger hook member may be provided with a protruded-shape portion that protrudes into the opening portion when the grip portion is received in the insertion recess portion. According to this construction, since the base portion or the finger hook member is provided with the protruded-shape portion that has such a shape as to protrude into the opening portion, the facing direction of the base portion or the finger hook member, that is, the facing direction of the oil level gauge, can easily be known, so that the mismounting of the oil level gauge can be prevented. Furthermore, the opening portion can be closed by the protruded-shape portion, so that it is possible to restrain water from entering the vicinity of the dipstick insertion hole when the upper surface of the internal combustion engine is washed.

In particular, the opening portion may be narrowed by extension walls that extend from portions of the peripheral wall that are adjacent to the opening portion in such extending directions that the extension walls approach each other. According to this construction, since the intrusion path for water intruding into the insertion hole through the opening portion is narrowed, it is possible to more effectively restrain water from entering the vicinity of the insertion hole when the upper surface of the internal combustion engine is washed.

Furthermore, the finger hook member may be a platy member that has an outer edge portion that faces the peripheral wall across a small space, and when the grip portion is received in the insertion recess portion, a dipstick insertion direction-side surface of the finger hook member may be located toward the bottom surface of the insertion recess portion from a counter dipstick insertion direction-side surface of the peripheral wall. According to this construction, a portion of the peripheral wall that is open upward is closed by the finger hook member of the grip portion, and water intrusion from the upper surface of the internal combustion engine into the insertion recess portion can be restrained.

Furthermore, the bottom surface of the insertion recess portion may have a downward inclination to a side of the opening portion when the internal combustion engine is mounted in a vehicle. According to this construction, even if water intrusion occurs in a portion surrounded by the peripheral wall at the time of washing the upper surface of the internal combustion engine, water can be let out from a portion that has an opening, so that water intrusion into the dipstick insertion hole can be restrained.

In particular, the bottom surface of the insertion recess portion may be provided with an annular boss portion that externally surrounds the dipstick insertion hole. According to this construction, even if water intrusion occurs in a portion surrounded by the peripheral wall at the time of washing the upper surface of the internal combustion engine, water will flow outside the boss portion and flow toward a portion that has an opening, so that water intrusion into the dipstick insertion hole can be further restrained.

Furthermore, the protruded-shape portion of the grip portion may be provided on the base portion. According to this construction, since the facing direction of the oil level gauge is restricted by the protruded-shape portion of the base portion, so that the shape of the finger hook member can be made compact. Therefore, a large space can be secured on the side where an operating person's finger is hooked on the finger hook member can be secured, and therefore the ease of the mounting operation can be improved.

Alternatively, the protruded-shape portion of the grip portion may be provided on the finger hook member. According to this construction, when a finger is inserted into the finger insertion hole, the finger can be easily hooked on the protruded-shape portion, so that the oil level gauge can be pulled out without a need to fully insert the finger into the finger insertion hole. Further, since the provision of the protruded-shape portion adds to the area of the upper surface of the finger hook member, it becomes easier to press the upper surface of the finger hook member with the finger or the thumb when the oil level gauge is to be inserted. Therefore, the ease of operation at the time of checking lubricating oil can be improved.

Still further, the insertion recess portion may be provided as a recessed portion formed in a breather chamber case or a head cover attached to a cylinder head of the internal combustion engine. According to this construction, since the insertion recess portion can be provided as a recessed portion formed in the upper portion of the internal combustion engine, it is possible to adopt a design such that the grip portion will not protrude from the upper portion of the internal combustion engine when the oil level gauge has been mounted. Thus, interference of the grip portion with another member can be avoided.

Obviously, numerous modifications and variations of the present invention are possible in light of the above teachings. It is therefore to be understood that within the scope of the appended claims, the invention may be practiced otherwise than as specifically described herein.

What is claimed is:

1. An oil level gauge mounting structure for an oil level gauge that measures a lubricating oil surface position in an oil pan of an internal combustion engine, comprising:
   the oil level gauge including a grip portion of the oil level gauge which has a finger insertion hole into which a finger of an operating person is configured to be inserted, and a dipstick that extends from the grip portion and that measures the lubricating oil surface position in the oil pan;
   a dipstick insertion hole provided in an upper portion of the internal combustion engine which accepts insertion of the dipstick;
   a peripheral wall provided in the upper portion of the internal combustion engine which at least partially defines an insertion recess portion that receives the grip portion by surrounding the grip portion, except from a finger insertion direction for the finger insertion hole, when the dipstick is inserted in the insertion hole; and
   an opening portion provided in the upper portion of the internal combustion engine which is open in the finger insertion direction for the finger insertion hole,
   wherein the insertion recess portion has such a shape that the insertion recess portion is capable of receiving the grip portion in such a facing direction in which the finger insertion hole is substantially aligned with the opening portion but is incapable of receiving the grip portion in every other facing direction in which the finger insertion hole is not substantially aligned with the opening portion.

2. The oil level gauge mounting structure according to claim 1,
   wherein the grip portion includes a base portion that is coupled to the dipstick and that is to face a bottom surface of the insertion recess portion and a finger hook member coupled, via a connecting wall, to a counter dipstick insertion direction side of the base portion that is opposite to a dipstick insertion direction side that faces in an insertion direction for the dipstick, and wherein at least one of the base portion and the finger hook member is provided with a protruded-shape portion that protrudes into the opening portion when the grip portion is received in the insertion recess portion.

3. The oil level gauge mounting structure according to claim 2, wherein the finger hook member is a platy member that has an outer edge portion that faces the peripheral wall across a small space, and wherein when the grip portion is received in the insertion recess portion, a dipstick insertion direction-side surface of the finger hook member is located toward the bottom surface of the insertion recess portion from a counter dipstick insertion direction-side surface of the peripheral wall.

4. The oil level gauge mounting structure according to claim 1, wherein a bottom surface of the insertion recess portion has a downward inclination to a side of the opening portion when the internal combustion engine is mounted in a vehicle.

5. The oil level gauge mounting structure according claim 4, wherein the bottom surface of the insertion recess portion is provided with an annular boss portion that externally surrounds the dipstick insertion hole.

6. The oil level gauge mounting structure according to claim 1, wherein the protruded-shape portion of the grip portion is provided on the base portion.

7. The oil level gauge mounting structure according to claim 1, wherein the protruded-shape portion of the grip portion is provided on the finger hook member.

8. The oil level gauge mounting structure according to claim 1, wherein the insertion recess portion is provided as a recessed portion formed in a breather chamber case or a head cover attached to a cylinder head of the internal combustion engine.

9. The oil level gauge mounting structure according claim 1, wherein the insertion recess portion is incapable of receiving the grip portion in every other facing direction due to interference between the peripheral wall and the grip portion after the dipstick is inserted into the dipstick insertion hole.

10. The oil level gauge mounting structure according claim 1, wherein the dipstick is configured to be inserted through the dipstick insertion hole in a height direction, and wherein the opening portion is disposed at a height that overlaps with a height at which the insertion recess portion is disposed, the height of the opening portion and the height of the insertion recess portion being measured in the height direction.

11. An oil level gauge mounting structure for an oil level gauge that measures a lubricating oil surface position in an oil pan of an internal combustion engine, comprising:

the oil level gauge including a grip portion of the oil level gauge which has a finger insertion hole into which a finger of an operating person is configured to be inserted, and a dipstick that extends from the grip portion and that measures the lubricating oil surface position in the oil pan;

a dipstick insertion hole provided in an upper portion of the internal combustion engine which accepts insertion of the dipstick;

a peripheral wall provided in the upper portion of the internal combustion engine which at least partially defines an insertion recess portion that receives the grip portion by surrounding the grip portion, except from a finger insertion direction for the finger insertion hole, when the dipstick is inserted in the insertion hole; and an opening portion provided in the upper portion of the internal combustion engine which is open in the finger insertion direction for the finger insertion hole, wherein the insertion recess portion has such a shape that the insertion recess portion is capable of receiving the grip portion in such a facing direction that the finger insertion direction is substantially aligned with a direction of the opening portion but is incapable of receiving the grip portion in any other facing direction, wherein the grip portion includes a base portion that is coupled to the dipstick and that is to face a bottom surface of the insertion recess portion and a finger hook member coupled, via a connecting wall, to a counter dipstick insertion direction side of the base portion that is opposite to a dipstick insertion direction side that faces in an insertion direction for the dipstick, wherein at least one of the base portion and the finger hook member is provided with a protruded-shape portion that protrudes into the opening portion when the grip portion is received in the insertion recess portion, and wherein the opening portion is narrowed by extension walls that extend from portions of the peripheral wall that are adjacent to the opening portion in such extending directions that the extension walls approach each other.

12. An oil level gauge mounting structure comprising:

an oil level gauge comprising:

a grip portion having a finger insertion hole which defines a finger insertion direction for the finger insertion hole and into which a finger of an operating person is configured to be inserted from the finger insertion direction for the finger insertion hole; and a dipstick extending from the grip portion to measure a lubricating oil surface position in an oil pan of an internal combustion engine;

a dipstick insertion hole which is provided in an upper portion of the internal combustion engine and into which the dipstick is inserted;

a peripheral wall provided in the upper portion of the internal combustion engine, the peripheral wall surrounding the grip portion from directions except the finger insertion direction for the finger insertion hole so as to define an insertion recess portion to receive the grip portion in a state in which the dipstick is inserted in the dipstick insertion hole; and an opening portion provided in the upper portion of the internal combustion engine, the opening portion being open in the finger insertion direction for the finger insertion hole in the state in which the dipstick is inserted in the dipstick insertion hole, the insertion recess portion having a shape so that the insertion recess portion receives the grip portion in a state in which the grip portion faces a facing direction in which the finger insertion hole is substantially aligned with the opening portion and so that the insertion recess portion prevents receipt of the grip portion in a state in which the finger insertion hole and the opening portion are not substantially aligned.

13. The oil level gauge mounting structure according to claim 12, wherein the grip portion includes a base portion that is coupled to the dipstick and that is to face a bottom surface of the insertion recess portion and a finger hook member coupled, via a connecting wall, to a counter dipstick insertion direction side of the base portion that is opposite to a dipstick insertion direction side that faces in an insertion direction for the dipstick insertion hole, and wherein at least one of the base portion and the finger hook member is provided with a protruded-shape portion that protrudes into the opening portion in a state in which the grip portion is received in the insertion recess portion.

14. The oil level gauge mounting structure according to claim 13, wherein the finger hook member comprises a platy member that has an outer edge portion that faces the peripheral wall across a small space, and wherein in a state in which the grip portion is received in the insertion recess portion, a dipstick insertion direction-side surface of the finger hook member is located toward the bottom surface of the insertion recess portion from a counter dipstick insertion direction-side surface of the peripheral wall.

15. The oil level gauge mounting structure according claim 13, wherein a bottom surface of the insertion recess portion is provided with an annular boss portion that externally surrounds the dipstick insertion hole, and wherein the base portion has an outward flange shape that is larger in a diametrical dimension than the annular boss portion.

16. The oil level gauge mounting structure according to claim 12, wherein a bottom surface of the insertion recess portion has a downward inclination to a side of the opening portion in a state in which the internal combustion engine is mounted in a vehicle.

17. The oil level gauge mounting structure according claim 16, wherein the bottom surface of the insertion recess portion is provided with an annular boss portion that externally surrounds the dipstick insertion hole.

18. The oil level gauge mounting structure according to claim 12, wherein a protruded-shape portion of the grip portion is provided on a base portion of the grip portion.

19. The oil level gauge mounting structure according to claim 12, wherein a protruded-shape portion of the grip portion is provided on a finger hook member of the grip portion.

20. The oil level gauge mounting structure according to claim 12, wherein the insertion recess portion is provided as a recessed portion provided in a breather chamber case or a head cover attached to a cylinder head of the internal combustion engine.

21. The oil level gauge mounting structure according claim 12, wherein the insertion recess portion is incapable of receiving the grip portion in every facing direction in which the finger insertion hole is not substantially aligned with the opening portion due to interference between the peripheral wall and the grip portion after the dipstick is inserted into the dipstick insertion hole.

22. The oil level gauge mounting structure according claim 12, wherein the dipstick is configured to be inserted through the dipstick insertion hole in a height direction, and wherein the opening portion is disposed at a height that overlaps with a height at which the insertion recess portion is disposed, the height of the opening portion and the height of the insertion recess portion being measured in the height direction.

23. An oil level gauge mounting structure comprising:

an oil level gauge comprising:
  a grip portion having a finger insertion hole which defines a finger insertion direction for the finger insertion hole and into which a finger of an operating person is configured to be inserted from the finger insertion direction for the finger insertion hole; and
  a dipstick extending from the grip portion to measure a lubricating oil surface position in an oil pan of an internal combustion engine;

a dipstick insertion hole which is provided in an upper portion of the internal combustion engine and into which the dipstick is inserted;

a peripheral wall provided in the upper portion of the internal combustion engine, the peripheral wall surrounding the grip portion from directions except the finger insertion direction for the finger insertion hole so as to define an insertion recess portion to receive the grip portion in a state in which the dipstick is inserted in the dipstick insertion hole; and an opening portion provided in the upper portion of the internal combustion engine, the opening portion being open in the finger insertion direction for the finger insertion hole in the state in which the dipstick is inserted in the dipstick insertion hole, the insertion recess portion having a shape so that the insertion recess portion receives the grip portion in a state in which the grip portion faces a facing direction in which the finger insertion direction for the finger insertion hole is substantially same as a direction of the opening portion and so that the insertion recess portion does not receive the grip portion in a state in which the grip portion faces another facing direction in which the finger insertion direction for the finger insertion hole is not substantially same as the direction of the opening portion, wherein the grip portion includes a base portion that is coupled to the dipstick and that is to face a bottom surface of the insertion recess portion and a finger hook member coupled, via a connecting wall, to a counter dipstick insertion direction side of the base portion that is opposite to a dipstick insertion direction side that faces in an insertion direction for the dipstick insertion hole, wherein at least one of the base portion and the finger hook member is provided with a protruded-shape portion that protrudes into the opening portion in a state in which the grip portion is received in the insertion recess portion, and wherein the opening portion is narrowed by extension walls that extend from portions of the peripheral wall that are adjacent to the opening portion in such extending directions that the extension walls approach each other.

* * * * *